United States Patent
Duguay et al.

(10) Patent No.: US 6,201,914 B1
(45) Date of Patent: Mar. 13, 2001

(54) TAPERED WAVEGUIDE FOR OPTICAL DISPERSION COMPENSATION

(75) Inventors: Michel Duguay, Ste-Foy; Dominique Brichard, Quebec City; Vincent Delisle, Ottawa, all of (CA); Uwe Langbein, Bickenbach (DE); Udo Trutschel, Brookline, MA (US)

(73) Assignee: Université Laval, Quebec (CA)

( * ) Notice: Subject to any disclaimer, the term of this patent is extended or adjusted under 35 U.S.C. 154(b) by 0 days.

(21) Appl. No.: 09/060,361

(22) Filed: Apr. 15, 1998

Related U.S. Application Data

(60) Provisional application No. 60/043,345, filed on Apr. 15, 1997.

(51) Int. Cl.[7] .................................................. G02B 6/26
(52) U.S. Cl. ............................ 385/43; 385/27; 385/28; 385/50
(58) Field of Search ................................ 385/15, 27, 28, 385/30, 31, 39, 42, 43, 50

(56) References Cited

U.S. PATENT DOCUMENTS

| | | | |
|---|---|---|---|
| 4,690,489 | * 9/1987 | Neyer | 385/50 |
| 4,969,710 | 11/1990 | Tick et al. | 385/123 |
| 5,448,674 | 9/1995 | Vengsarkar et al. | 385/123 |
| 5,459,807 | 10/1995 | Doumuki et al. | 385/129 |
| 5,473,719 | 12/1995 | Stone | 385/123 |
| 5,488,679 | 1/1996 | Wu | 385/15 |
| 5,504,829 | 4/1996 | Evans et al. | 385/123 |
| 5,522,005 | 5/1996 | Moretti et al. | 385/129 |
| 5,530,778 | 6/1996 | Rast | 385/24 |
| 5,559,912 | * 9/1996 | Agahi et al. | 385/42 |
| 5,559,920 | 9/1996 | Charaplyvy et al. | 385/123 |
| 5,568,583 | 10/1996 | Akasaka et al. | 385/123 |
| 5,570,439 | 10/1996 | Ido et al. | 385/37 |
| 5,572,619 | 11/1996 | Maruo et al. | 385/143 |

* cited by examiner

Primary Examiner—John D. Lee
(74) Attorney, Agent, or Firm—Oblon, Spivak, McClelland, Maier & Neustadt, P.C.

(57) ABSTRACT

The optical device provides dispersion adjustment or compensation using resonant coupling between a first waveguide and a second waveguide which has a variable thickness and a significantly different index of refraction. The two waveguides are optically coupled about a lateral coupling surface, and as light propagates down the waveguide, it passes from one waveguide to the other at a predetermined position along the propagation axis depending on the thickness of the second waveguide. Mode converters are used at the input and output of the device to provide for more efficient operation. The first waveguide can be made of silica and the second waveguide of silicon, thus providing a differential in the index of refraction of about 2. For dispersion compensation, in which shorter wavelengths need to be retarded with respect to longer wavelengths, the profile of the thickness of the second waveguide is such that shorter wavelengths spend more time in the silicon than do longer wavelengths. The shorter wavelength components are thus slowed down more than the longer wavelength components in the optical communications signal.

19 Claims, 7 Drawing Sheets

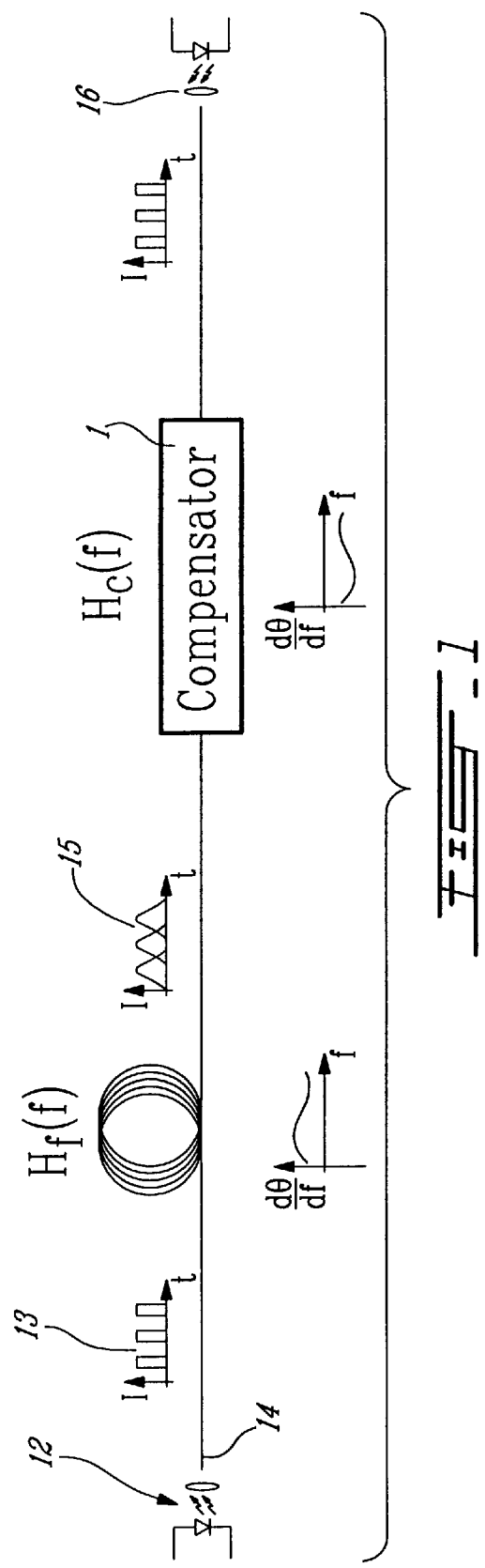

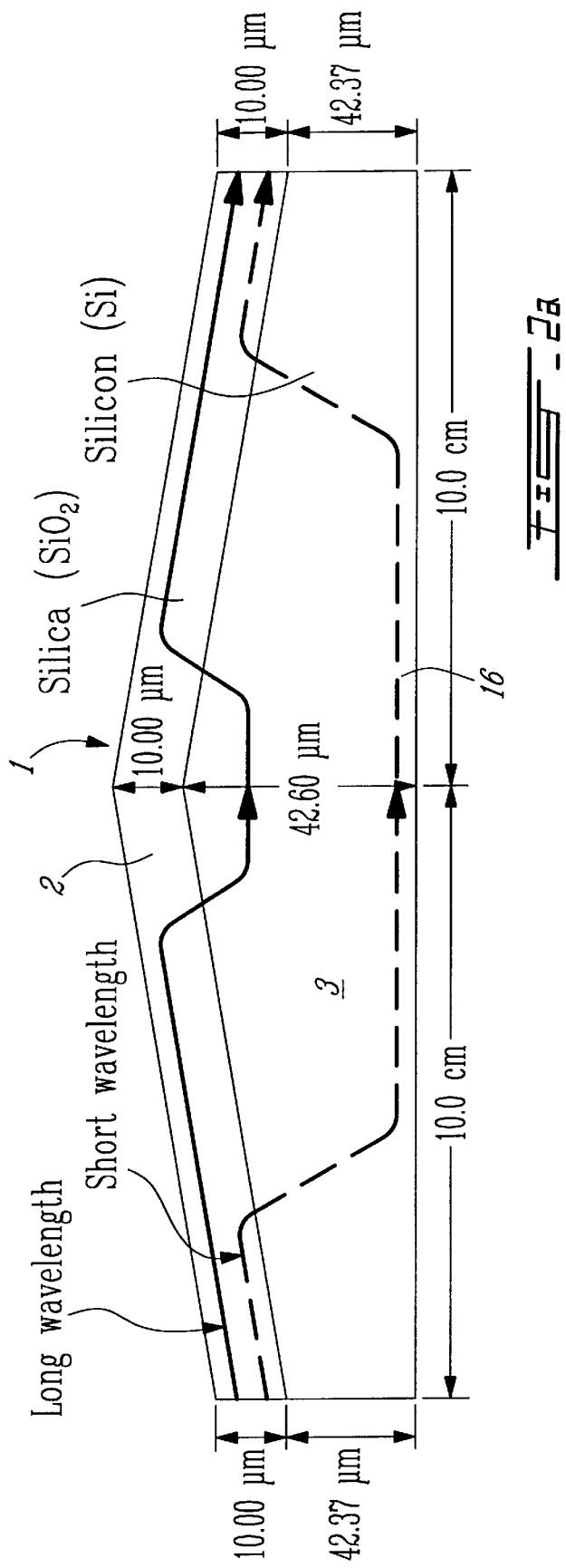

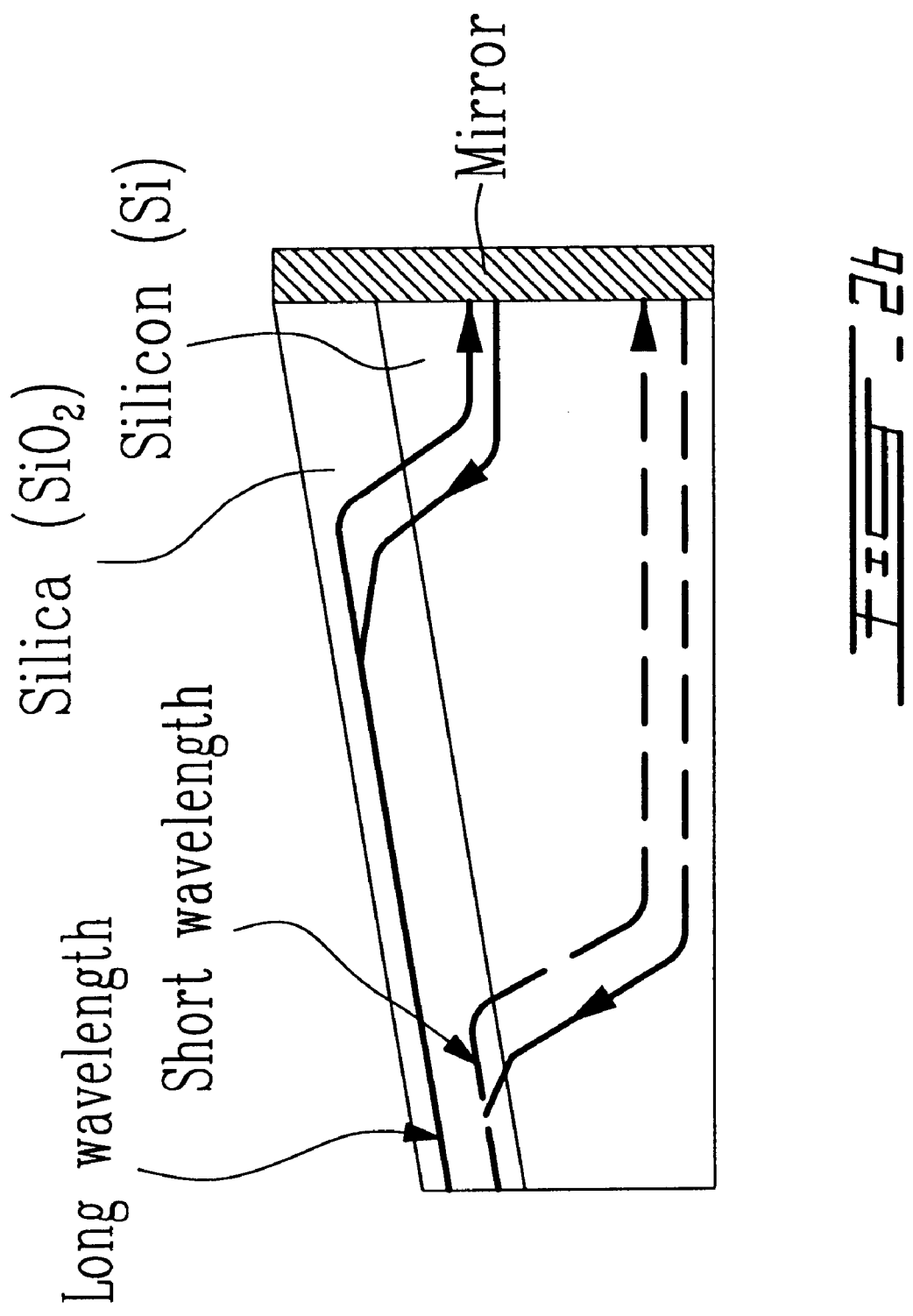

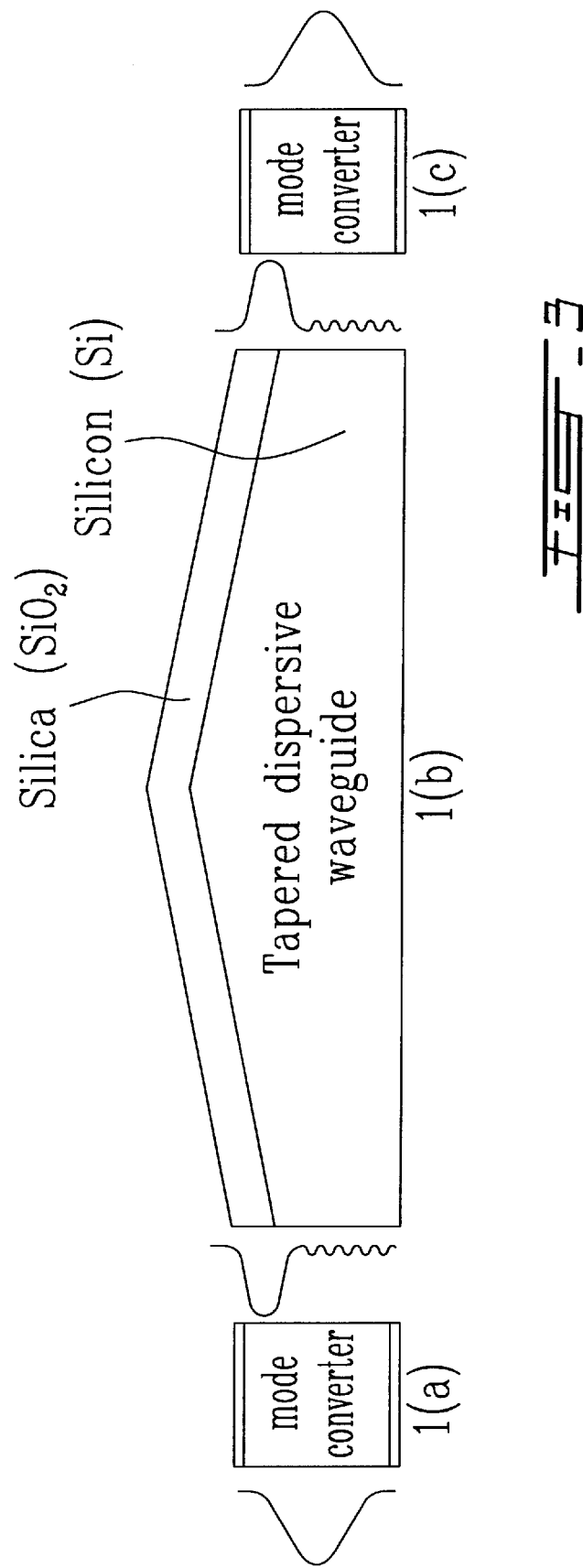

TAPERED WAVEGUIDE FOR OPTICAL DISPERSION COMPENSATION

This non-provisional application claims priority under 35 U.S.C. §119(e) from Provisional Application Ser. No. 60/043,345, filed Apr. 15, 1997.

FIELD OF THE INVENTION

The present invention relates to a waveguide for providing optical dispersion management of a single channel or multiple channels in a wavelength division multiplexing (WDM) optical communication system. In particular, the invention provides an optical waveguide which creates large positive or negative dispersion so as to compensate for dispersion of pulsed light transmissions passing through optical fiber systems.

BACKGROUND OF THE INVENTION

One of the fundamental problems which exist in long haul high rate optical communications is chromatic dispersion of light pulses passing through fiber optic lines. This dispersion causes different wavelengths to travel through the optical waveguide at different speeds. An optical communications light pulse which is part of a bit stream is created by a transmission laser operating at a predetermined carrier optical frequency or wavelength (the words frequency, represented by f, and wavelength in vacuum, represented by l, will be used interchangeably, as is currently done in the art, with l related to f by the equation l=c/f, where c is the speed of light, viz. 299 792 458 m/s).

The pulse has a given intensity and duration which can be detected at a receiver located at an opposite end of the communications waveguide (typically the optic fiber) some distance away from the transmitter, perhaps a few to tens of kilometers away. The light pulse comprises spectral components covering a certain bandwidth Df, which is generally in the range 10–60 GHz in modern optical communications systems operating in the bit rate range of 2.5–10 Gb/s. In optical fibers used for communications, the group velocity associated with each spectral component varies with its optical frequency (or wavelength). This means that the lowfrequency spectral components of a light pulse do not travel at the same velocity as its high frequency components. This causes a light pulse initially injected into a fiber with duration Dt to broaden out (in others words to become "dispersed") to a duration Dt' after propagating through a certain length of optical fiber. As an example, in conventional fibers deployed over land, the dispersion is typically 17 ps/nm/km. This means that two spectral components separated by say 10 GHz at a carrier frequency of 193 000 GHz (l=1553.329 nm), corresponding therefore to a wavelength separation of 0.0804 nm, would undergo a differential delay (or dispersion) of 17 ps/nm/km times 0.0804 nm, i.e. 1.37 ps/km, or 137 ps after 100 km of fiber (the sign of the dispersion in conventional fibers is such that low frequency light travels at a lower group velocity than highfrequency light). Light pulses that may be initially 25 ps in duration in a 10 Gb/s optical communication system have spectral components that cover several tens of GHz. The time dispersion between the low- and the high-frequency spectral components of such a light pulse are therefore more than 137 ps after a 100-km stretch of fiber. Such a large amount amount of dispersion is intolerable since, the pulses being 100 ps apart, dispersion will make subsequent pulses start overlapping to a considerable degree and increase the bit error rate.

Therefore, dispersion causes a spreading of laser pulses over great distances (even in the most non-dispersive optic fibers) such that the pulse energy is spread out and lower-frequency spectral components trail behind higher-frequency components of the laser pulse.

When the bit time slot in an optical communication system is large enough, dispersion causes a small portion of the pulse energy to spill over into adjacent bit time slots. The pulse height at the receiver will be marginally lower, but still detectable as a bit, and empty bit slots (e.g. representing zeros) will contain small amounts of spill over light, which will be below the predetermined detection threshold. However, as the bit time slots are made smaller so as to increase the bit rate and increase transmission capacity, dispersion of a very short light pulse may significantly reduce the light intensity in the bit time slot and even cause enough spill over into adjacent empty bit time slots so as to cause difficulty in the detection of zeroes.

Dispersion thus produces the spreading of short optical pulses, and thus affects negatively the quality of a communication link. If the dispersion of a light pulse is great enough, the communication link utilizing the light pulses becomes unstable, and eventually, unusable.

In addition to problems in optical communications, dispersion is also a major problem in the generation of very short, high power optical laser pulses. The spreading of the pulses reduces the achieved peak power, and thus reduces the efficiency of the laser pulses.

Various attempts have been made to address the problem of dispersion in optical signals. Three basic approaches have been developed. The first approach is to pass the optical signal transmitted, which has suffered dispersion due to the optical transmission waveguide, through a length of waveguide having an opposite sign of dispersion at the communications wavelength before feeding the signal to the receiver. U.S. Pat. No. 4,969,710 to Tick et al. is an example of such a method. The second approach has been to use optical devices to separate the light pulse into its wavelength components, then to suject the separated components to different delays before recombining the components into a single dispersion compensated optic signal. U.S. Pat. No. 5,473,719 to Stone is an example of this approach. The third approach has been to use chirped in-fiber Bragg gratings to reflect each wavelength component at different points such that the reflected optical signal has been dispersion compensated. This approach is disclosed in a paper by Franqois Ouellette, titled "Dispersion cancellation using linearly chirped Bragg grating filters in optical waveguides", Optics Letters, vol. 12, pp. 847–849, October 1987. Experimental results have been reported in the paper by W. H. Loh, R. I. Laming, N. Robinson, A. Cavaciuti, F. Vaninetti, C. J. Anderson, M. N. Zervas, and M. J. Cole, titled "Dispersion compensation over distances in excess of 500 km for 10-Gb/s systems using chirped fiber gratings", IEEE Photonics Technology Letters, vol. 8, pp.944–946, July 1996.

Other known prior art attempts to resolve these problems arm disclosed in U.S. Pat. No. 5,570,439 to Ido et al.; U.S. Pat. No. 5,568,583 to Akasaka et al; U.S. Pat. No. 5,559,920 to Chraplyvy et al.; U.S. Pat. No. 5,530,778 to Rast; U.S. Pat. No. 5,504,829 to Evans et al.; U.S. Pat. No. 5,448,674 to Vengsarkar et al.

Known dispersion compensators are bulky, generally limited to a single channel wavelength and/or have significant losses. The advantage of the dispersion management device proposed here is that it could me manufactured using integrated optic techniques so that it could be very compact and low-cost. In addition the taper lends itself very naturally to tayloring the dispersion as a function of wavelength in a way to match (and compensate) that of an optical fiber. In 10 Gb/s and higher bit rate system the variation of the dispersion with wavelength (from 16 ps/nm/km at 1530 nm to 17 ps/nm/km at 1580 nm, for example, in certain optical fibers) is a factor that is now considered. Our device can offer this wavelength taylored dispersion profile and can do so over very broad wavelength bands.

SUMMARY OF THE INVENTION

It is an object of the present invention to provide a dispersion compensator which makes use of a wavelength dependent transition between two optical waveguide media having different indices of refraction to carry out dispersion compensation It is a further object of the present invention to provide a compact, low loss optical waveguide device for carrying out dispersion compensation.

Therefore, it is an object of the present invention to provide a dispersion compensator in which the light pulse must travel from a first medium having a first typically low refractive index to a second medium having a second typically high refractive index, and back to the first medium so as to introduce a differential delay between the low- and high-frequency spectral components of a light pulse.

It is another object of the present invention to provide a dispersion compensator which can be used for compensating dispersion of certain light frequency bands by altering geometrical or material characteristics of the dispersion compensator.

These and other objects are achieved by a dispersion compensator formed by joining together two discrete layers of material having two different indexes of refraction into a single unit. The first layer of material is substantially planar and of substantially uniform thickness and the second layer of material is tapered on its upper surface. The taper is such that during the first half of a pulse's passage through the compensator the high-index material tapers up, while in the second half it tapers down. The layers of material are designed to have a large absolute difference index ($\Delta n$ greater than 0.5), so that when an optical pulse passes from the first layer of material to the second layer of material, a differential delay is introduced between the low- and high-frequency components of the pulse due to the difference in the refractive index.

When the optical pulse emerges from the second bottom layer of material and returns to the first top layer of material, the differential delay introduced is such that the waveform dispersion is compensated for the dispersion caused by the spreading of the pulse during its travel through a fiber optic link. The result is an optical pulse in which the dispersion is negated, and the pulse thus becomes usable in its desired application. In another feature of the present invention, the geometry and material characteristics of the dispersion compensator can be specifically designed so as to produce positive or negative dispersion, or to alter the degree of dispersion, depending upon the desired application.

According to the invention, there is provided an optical device comprising: an input; a first waveguide having a first low index of refraction and a lateral coupling surface, the first waveguide able to guide a mode of light; a second waveguide having a second high index of refraction significantly different from the first index of refraction, a corresponding lateral coupling surface coupled to the lateral surface of the first waveguide, the second waveguide having a variable thickness selected to allow a predetermined wavelength to pass between the first and the second waveguide at a predetermined distance from the entrance face of the device; and an output.

Preferably, the input is at one end face of the first waveguide, and the output comprises a first output at another end face of the first waveguide.

Also preferably, the thickness varies gradually so as to allow neighboring wavelength components of an optical signal to undergo chromatic dispersion by coupling from the first waveguide to the second waveguide at different positions.

BRIEF DESCRIPTION OF THE DRAWINGS

The invention will be better understood by way of the following detailed description of a preferred embodiment and alternate embodiments with reference to the appended drawings, in which:

FIG. 1 is a schematic diagram of a photonic communications link including a chromatic dispersion compensator;

FIG. 2a is a cross sectional view of a preferred embodiment for a high performance tapers waveguide for a broadband WDM optical dispersion compensator according to the present inventions, FIG. 2b is a cross sectional view of another embodiment wherein a reflector is placed at a middle point of the device described in the preferred embodiment in order to provide dispersion compensation;

FIG. 3 illustrates in block format the preferred embodiment including input and output mode converters;

DETAILED DESCRIPTION OF THE PREFERRED EMBODIMENTS

Figure 4:
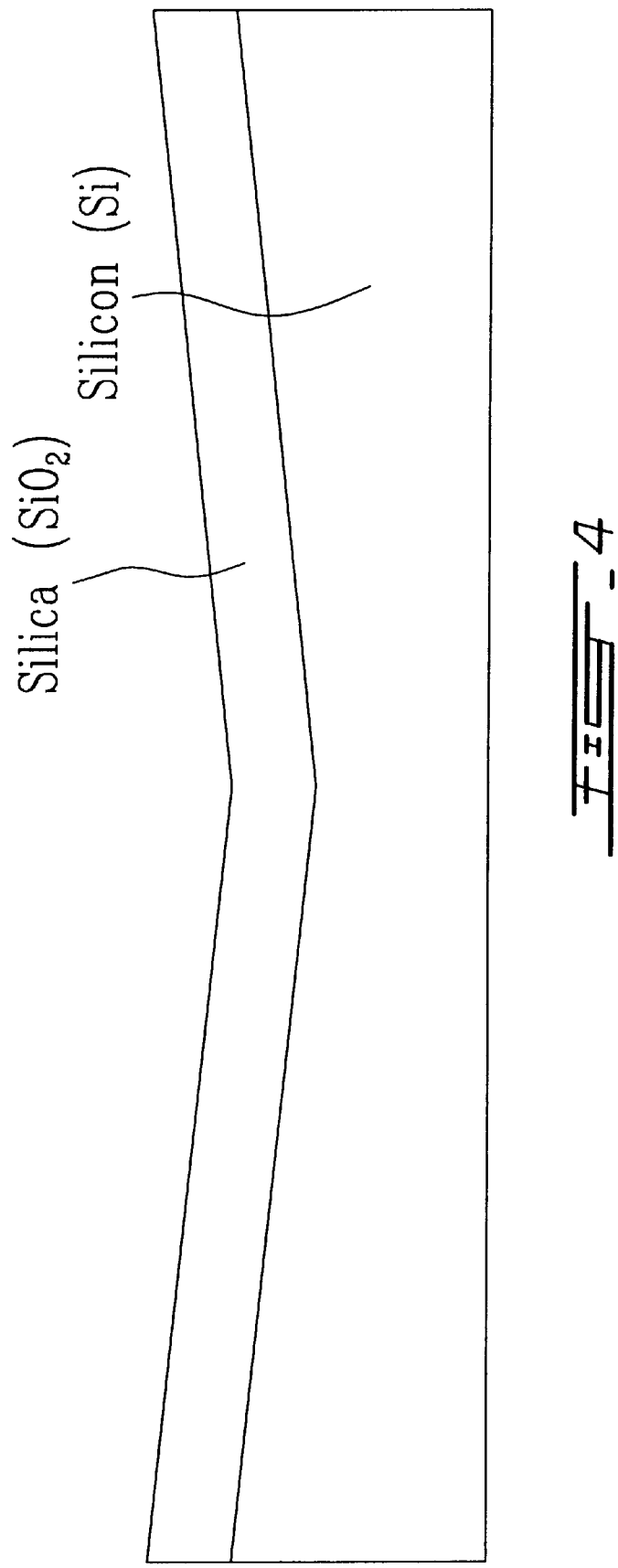
FIG. 4 illustrates a device for dispersion management where long wavelength components travel faster than short wavelength coponents, having a high index layer that first tapers down and then up.

As shown in FIG. 1, an optical communication link comprises a sending or transmitting light source, such as a diode laser 12, generating a pulse train 13 optically coupled to a fiber 14. Over a great distance, the square pulse train 13 undergoes chromatic dispersion causing the pulses to appear at the remote end with spreading as shown at 15. The compensator 1 restores the pulses before detection at a detector 16.

In the preferred embodiment, as illustrated in FIGS. 2 and 3, the dispersion compensator device 1 comprises three components, namely an input mode converter 1a, a dispersive waveguide 1b, and an output mode converter 1c. The structure of the dispersive waveguide 1b is as shown in FIG. 2a. A first waveguide 2 is made of silica (SiO2) and has a thickness of 10.00 $\mu$m. A second waveguide 3 is made of silicon (Si) and has a tapered thickness starting at 42.37$\mu$m and having a thickness in the middle of 42.60 $\mu$m. The thickness variation is exaggerated in the drawing for the purposes of illustration. In the first half of the device where the high-index silicon layer is tapering up,the longer wavelengths couple and pass from the silica to the silicon at a propagation distance further from the input than the shorter wavelengths. In the second half of the device where the high-index silicon layer is tapering down, the reverse occurs, and the longer wavelengths are the first to couple back from the silicon into the silica. Thus the shorter wavelength components go through much more silicon than the longer wavelength components. Since the index of refraction of the silica is about 1.44, while for the silicon it is about 3.48, the shorter wavelengths which spend more time in the silicon are slowed down more with respect to the longer wavelengths. The effect is to cause compensation of the chromatic dispersion caused by the fiber 14 which slows down redder components more than bluer components. The component 1b has a length of about 20 cm.

The device is so designed that the distance at which light at a given optical frequency will couple from the low-index silica layer into the high-index silicon layer is determined by the programmed taper in the high-index layer. Transfer of the optical power from the low-index layer to the high-index layer occurs near a resonance in the latter, i.e. when the lateral mode profile of the optical electric field comprises an integral number of half-wavelengths (the transverse wavelength in the medium is what is meant here) within the thickness of high-index material at that point on the taper. As a light pulse travels down the up-taper its highfrequency spectral components (which are the short-wavelength spectral components) are the first to enter into resonance with the high-index layer, and are therefore the first to couple massively into this high-index layer. Some distance further down the lower-frequency components (longer-wavelength components) enter into resonance and in turn couple massively into the high-index layer.

The group velocity of light in the high-index layer is much slower (it is typically 0.13 c in the example given with silicon) than in the low-index layer (it is typically 0.6 c in the example given with silica). The longer a given spectral component travels in the high-index layer, therefore, the more it is delayed relative to a spectral component that is traveling in the low-index layer.

To obtain a high dispersion, it is best to excite only one specific mode of the waveguide 2. The mode converters 1a and 1c thus increase efficiency. The mode converters may comprise holograms, adiabatic taper waveguides, phase masks or amplitude masks. The mode converter devices according to the preferred embodiment also guide the light from the first waveguide 2 to the input and output fibers.

The waveguide 1b is formed from a first waveguide layer of material 2 having a generally uniform thickness, and a second layer of material 3 that has a generally non-uniform thickness which defines a tapered upper surface (likewise the tapered surface may be the lower surface). The first layer of material and second layer of material are intended to have substantially different refractive indexes, such that the absolute difference in refractive index is preferably greater than 0.5. Preferred materials which achieve this absolute difference are silca and silicon for the wavelength range 1200 to 1800 nm where both materials are very transparent, although other optically transparent materials which obtain this same magnitude of difference in refractive index are also considered to be within the scope of the present invention. The thickness of the first layer of material ($D_1$) and the thickness of the second layer of material ($D_2$) should also be relatively large in comparison to the wavelengths of light passing through the respective mediums. For applications in optical communications, $D_1$ should preferably be greater than or equal to 2 micrometers, and $D_2$ should preferably be greater than or equal to 10 microns. Other dimensions for $D_1$ and $D_2$ may be utilized within the scope of the present invention.

Figure 5:
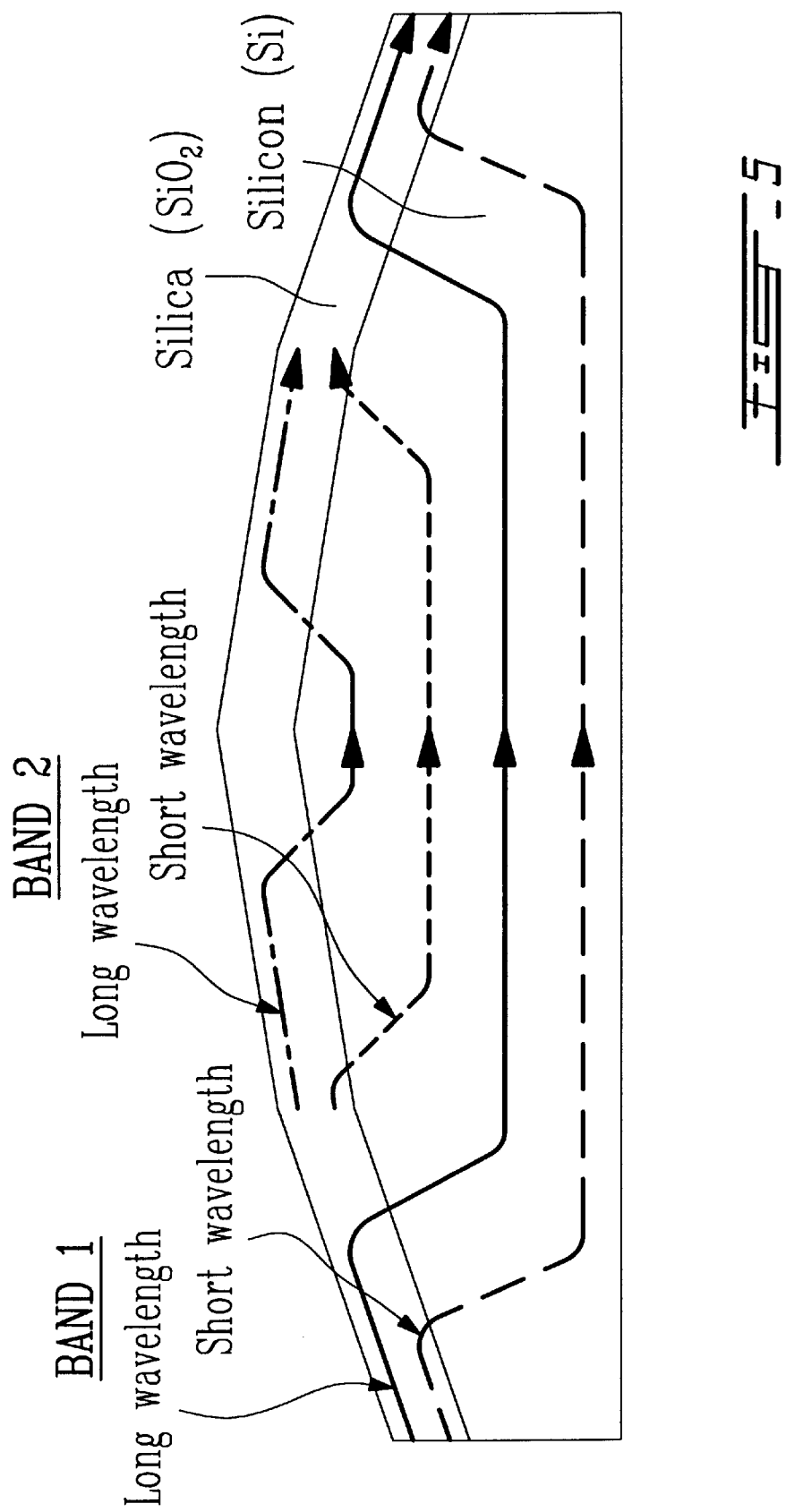
FIG. 5 illustrates a device with a programmed taper profile such that optical signals in channel 1 will undergo a certain dispersion that is less than the dispersion compensation undergone by optical signals in channel 2, because of the differing slopes of the taper.
Figure 6:
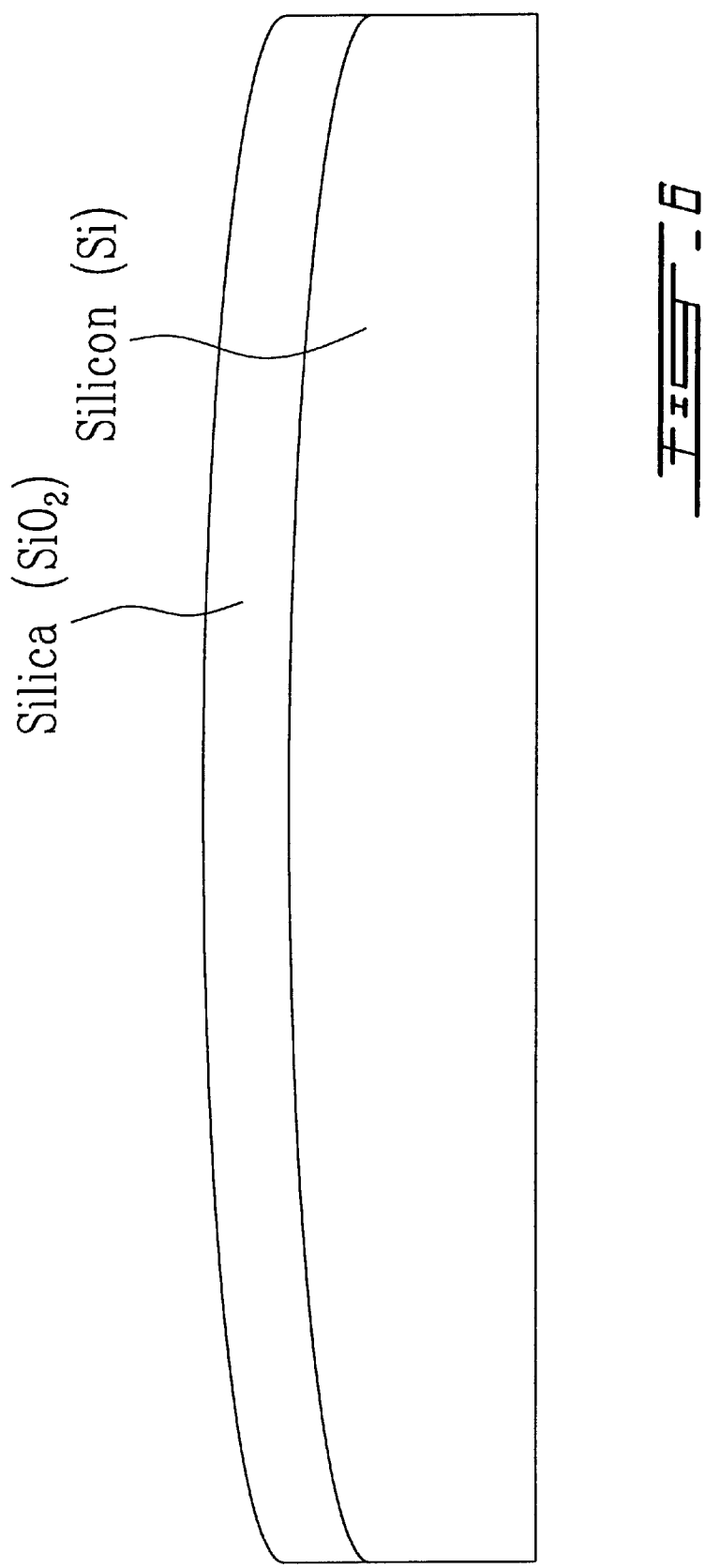
FIG. 6 illustrates a parabolic profile to obtain a dispersion which is linearly increasing with wavelength within a communications band.

As shown in FIGS. 4 through 6, the thickness profile of the second waveguide 3 may take on a variety of shapes. In FIG. 3 the simple linear taper gives a dispersion compensation which is constant over a band of about 7 nm (or 870 GHz in optical frequency). This would be enough bandwidth to compensate the dispersion of eight optical channels spaced by the standard 100-GHz channel spacing. Larger bandwidths can be achieved by using thinner layers of silicon. The constant dispersion bandwidth then increases in inverse proportion to the silicon thickness, but its magnitude decreases in direct proportion to the silicon thickness. For a given device a greater dispersion effect can be obtained by making several passes though the device.

In FIG. 4, the device has a high-index layer which first tapers down and then up. The reverse of what was happening in FIG. 3 now occurs. The long wavelength ("redder") spectral components of a light pulse will be the first to couple massively into the high-index layer (i.e. silicon, in one preferred embodiment) and they will be the last to exit the high-index layer and couple back into the low-index layer. The shorter wavelength ("bluer") components will couple further down the initial down-taper than the long wavelength components and they will be the first to couple back into the low-index layer. The long wavelength components spend therefore more time in the silicon than the shorter wavelength components.

The device of FIGS. 1, 2a and 3 operates as follows. Light pulses from an optical communications transmission are injected into the silica layer 2 at the left. As light begins to propagate its power distribution is largely confined to the silica layer. This is assured by having a silicon thickness near the input end face such that the silicon layer behaves as an antiresonant reflector as in the well-known ARROW (antiresonant reflecting optical waveguide) devices. As explained earlier, the light pulse comprises a spread of spectral components in the immediate vicinity of the carrier frequency. As the light pulse travels down the structure, there will first come a point along the taper where high frequency components begin to couple massively into the high-index layer because of a resonance condition (at this point the silicon ceases to be an antiresonant reflector to become a resonant one; the light electric field builds up resonantly in the silicon). Further down the taper, low frequency spectral components will in turn couple massively into the high-index silicon layer.

As the light pulse continues to sweep down the path of the compensator, the silicon layer reverses from an up-taper to a down-taper. The reverse process now occurs. At a point symmetric to the one where resonant coupling took place for a given spectral component, now optical power at that frequency couples back massively into the silica layer.

Because the silicon layer has a different index of refraction than the silica layer, and the high frequency components are confined to the silicon layer for a greater portion of the sweep through the compensator, the high frequency components of the pulse are slowed down relative to the low frequency components. This causes the waveform of the optical pulse to become much more uniform, and provides a substantial compensation for waveforms that have dispersed during travel though an optical fiber, In the case of FIGS. 2, 3, 5 and 6, the dispersion that is created by the taper device is "normal", i.e. it compensates for the anomalous dispersion (in anomalous dispersion redder spectral components travel slower than bluer components, the reverse is true for normal dispersion) of optical fibers in the 1500 nm band. In dispersion management one sometimes wishes to have an element with an anomalous dispersion. The device shown in FIG. 4 accomplishes that. The mode of operation is exactly as in the up-taper/down-taper device except that the roles of the bluer and redder spectral components are reversed.

FIG. 5. shows an example of how the silicon layer thickness can be programmed to give a dispersion that is wavelength dependent. Assume a spectrum divided into a short wavelength band called "BAND 1" and a long wavelength band called "BAND 2". For the part labeled "BAND 1" the slope might be such that it would compensate a fiber dispersion of say 16 ps/ml/km. Those optical signals falling within this band will come into resonance with the silicon in this first region of the taper and will experience a dispersion that would compensate this 16 ps/nm/km in a certain length of fiber. A second group of optical signals falling within the spectral band 2 will come into resonance with the silicon in the part of lower slope labeled "BAND 2". The magnitude of dispersion is inversely proportional to the slope of the taper. So, for band 2 the slope might compensate for say a fiber dispersion of 17 ps/nm/km. These dispersion figures apply to current conventional optical communications fibers for the short and long wavelength half of the Erbium band between 1530 and 1560 nm. In other cases, especially when a fiber is operated near a dispersion minimum, the variation of dispersion with wavelength could be more severe, so that the taylored dispersion offered by the device of FIG. 5 would be all the more useful.

For certain applications it might be useful to have several sections of the taper with different slopes. In this spirit, FIG. 6 shows a taper displaying a parabolic profile, such that the slope is increasing linearly with propagation distance. This will produce a dispersion which is progressively larger as the wavelength increases, This would be a good match for the dispersion in fibers which increases progressively with wavelength as one moves away from a dispersion minimum.

In view of these characteristics, it can be seen that the compensating device of the present invention can be specifically designed to produce a desired dispersion for a specific application. High degrees of difference between the indexes of refraction for the two layers of material produce a greater degree of dispersion in the high frequency components of the optical pulse. The shape of the upper surface of the compensator influences whether the dispersion is negative or positive. The thickness of the lower layer and the slope of this layer influence where the compensator converts from an anti-resonant reflector to a resonant reflector. By adjusting any one of these different variables in the manufacture of the compensator device, the compensator can be adjusted for different types of applications, depending on the types of dispersion problems which are encountered by a user.

As can be appreciated, it would be possible to place a reflector at a middle point of the device 1b to provide for dispersion compensation in a reflective device, much like a chirped Bragg grating device, This is shown in FIG. 2b. Of course, this device must be used in conjunction with an optical circulator.

What is claimed is:

1. An optical device for creating chromatic dispersion comprising:
    an input receiving an optic communications signal;
    a first waveguide having a first index of refraction and a lateral coupling surface, said first waveguide able to guide a mode of light;
    a second waveguide having a second index of refraction significantly different from said first index of refraction, a corresponding lateral coupling surface coupled to said lateral surface of said first waveguide, said second waveguide having a variable thickness selected to allow a predetermined wavelength to pass between said first and said second waveguide at a predetermined distance along said coupling surface, said thickness varying gradually so as to allow neighboring wavelength components of an optical signal to undergo chromatic dispersion by coupling from said first waveguide to said second waveguide at different positions; and
    an optical device output for outputting said optic communications signal with modified chromatic dispersion characteristics.

2. The device as claimed in claim 1, wherein said first index of refraction is substantially lower than said second index of refraction.

3. The device as claimed in claim 2, wherein said input is coupled to an end face of said first waveguide.

4. The device as claimed in claim 3, wherein said input and said optical device output is said end face of said first waveguide, another end of said first and said second waveguides being reflective, said thickness having a profile allowing selected wavelengths of light to couple between said first waveguide and said second waveguide, to be reflected from said other end, and then to couple back between said first waveguide to said second waveguide to said optical device output.

5. The device as claim in claim 3, wherein said input is said end face of said first waveguide, said optical device output in another end face of said first waveguide, said first and said second waveguide having sustantially rectangular cross-sections, said thickness having a profile allowing selected wavelengths of light to couple between said first waveguide and said second waveguide, and then back from said second waveguide to said first waveguide to said optical device output.

6. The device as claimed in claim 5, wherein said profile is a linear taper first increasing in thickness and then decreasing in thickness, said device acting as a dispersion compensator by slowing bluer components more than redder components.

7. The device as claimed in claim 5, wherein said profile is programmed to provide different degrees of dispersion compensation for different channel wavelengths.

8. The device as claimed in claim 7, wherein said profile comprises a plurality of linear taper segments first increasing in thickness and then decreasing in thickness.

9. The device as claimed in claim 5, further comprising a first mode converter for converting input light substantially to said mode of said first waveguide, said mode converter having an output coupled to said input.

10. The device as claimed in claim 9, further comprising a second mode converter for substantially converting a mode of light from said optical device output to a desired mode for output.

11. The device as claimed in claim 5, wherein said first waveguide is made of silica, and said second waveguide is made of silicon.

12. The device as claimed in claim 3, further comprising a first mode converter for converting input light substantially to said mode of said first waveguide, said mode converter having a mode converter output coupled to said input.

13. The device as claimed in claim 12, further comprising a second mode converter for substantially converting a mode of light from said optical device output to a desired mode for output.

14. The device as claimed in claim 13, wherein said first waveguide is made of silica, and said second waveguide is made of silicon.

15. The device as claimed in claim 3, wherein said first waveguide is made of silica, and said second waveguide is made of silicon.

16. The device as claimed in claim 3, wherein said optic signal is a WDM signal and said device provides dispersion compensation of at least two WDM optical channel signals.

17. The device as claimed in claim 1, further comprising a first mode converter for converting input light substantially to said mode of said first waveguide, said mode converter having a mode converter output coupled to said input.

18. The device as claimed in claim 17, further comprising a second mode converter for substantially converting a mode of light from said optical device output to a desired mode for output.

19. The device as claimed in claim 1, wherein said optic signal is a WDM signal and said device provides dispersion compensation of at least two WDM optical channel signals.

* * * * *